(12) United States Patent
Russell (10) Patent No.: US 6,753,994 B1
(45) Date of Patent: Jun. 22, 2004

(54) SPATIALLY CONFORMABLE TUNABLE FILTER

(75) Inventor: Stephen D. Russell, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 23 days.

(21) Appl. No.: 10/267,529

(22) Filed: Oct. 8, 2002

(51) Int. Cl.[7] .................... G02F 1/03; G02B 27/00
(52) U.S. Cl. ........................... 359/254; 359/578
(58) Field of Search ...................... 359/254, 260, 359/263, 267, 578

(56) References Cited

U.S. PATENT DOCUMENTS

| | | | |
|---|---|---|---|
| 5,570,139 A | 10/1996 | Wang | 348/744 |
| 5,986,808 A | * 11/1999 | Wang | 359/585 |
| 6,122,091 A | 9/2000 | Russell et al. | 359/245 |
| 6,297,907 B1 | * 10/2001 | Wang | 359/585 |
| 6,384,953 B1 | 5/2002 | Russell et al. | 359/245 |
| 2002/0036828 A1 | * 3/2002 | Wong | 359/585 |

OTHER PUBLICATIONS

Wang, Yu; Voltage Induced Color Selective Absorbtion With Surface Plasmons; Applied Physics Letters, vol. 67, No. 19, Nov. 6, 1995, pp. 2759–2761, USA.
Wang, Yu; Electronically Tunable Mirror With Surface Plasmons; Proc. SPIE vol. 3292, 1998, pp. 103–106; USA.
Wang, Yu; Surface Plasmon Tunable Filter and Spectrometer on a Chip; Proc. SPIE, vol. 3118, 1997, pp. 288–294; USA.

* cited by examiner

Primary Examiner—David N. Spector
(74) Attorney, Agent, or Firm—Michael A. Kagan; Peter A. Lipovsky; Allan Y. Lee (57) ABSTRACT

A spatially conformable tunable filter comprises a structure that includes a first flexible and optically reactive electrode; a second flexible and optically reactive electrode; a flexible electro-optic material layer affixed between the first and second electrodes and having a voltage dependent refractive index; and a voltage source connected to the first and second electrodes for establishing an electric field in the electro-optic material layer and dynamically controlling the index of refraction of the electro-optic material layer, wherein a section of said structure has an arcuate shaped neutral axis having a radius R, when said structure is flexed, where $0 < R \leq \infty$.

25 Claims, 10 Drawing Sheets

SPATIALLY CONFORMABLE TUNABLE FILTER

BACKGROUND OF THE INVENTION

A plasmon surface or plasmon interface is a collective excitation of electrons at an interface between a metal and a dielectric which absorbs all p-polarized light at its plasmon resonance frequency. P-polarized light is light with polarization in the plane tangent to the surface plasmon interface. The reflected light is the complementary color to the resonance. If a voltage is used to change the dielectric constant of a liquid crystal of a structure that includes a metal layer affixed to the liquid crystal, the light reflected from the plasmon interface will exhibit a color change. In the past, liquid crystal structures that incorporated plasmon surfaces were planar structures. However, a need exists for a structure that embodies a surface plasmon that may be configured over non-planar surfaces.

SUMMARY OF THE INVENTION

A spatially conformable tunable filter comprises a structure that includes a first flexible and optically reactive electrode; a second flexible and optically reactive electrode; a flexible electro-optic material layer affixed between the first and second electrodes and having a voltage dependent refractive index; and a voltage source connected to the first and second electrodes for establishing an electric field in the electro-optic material layer and dynamically controlling the index of refraction of the electro-optic material layer, wherein a section of said structure has an arcuate shaped neutral axis having a radius R when said structure is flexed, where $0 < R \leq \infty$.

A method is described for receiving a light signal at a plasmon interface between a flexible first electrode and a flexible electro-optic material; applying a voltage potential across the first electrode and a flexible second electrode in contact with the electro-optic material; and modulating the voltage potential to change the optical absorption characteristics of the plasmon interface, where the first and second electrodes and the electro-optic material define a structure with an arcuate shaped neutral axis having a radius R, where $0 < R \leq \infty$ when the structure is flexed.

BRIEF DESCRIPTION OF THE DRAWINGS

Throughout the several views, like elements are referenced using like references.

DESCRIPTION OF THE PREFERRED EMBODIMENT

Figure 1:
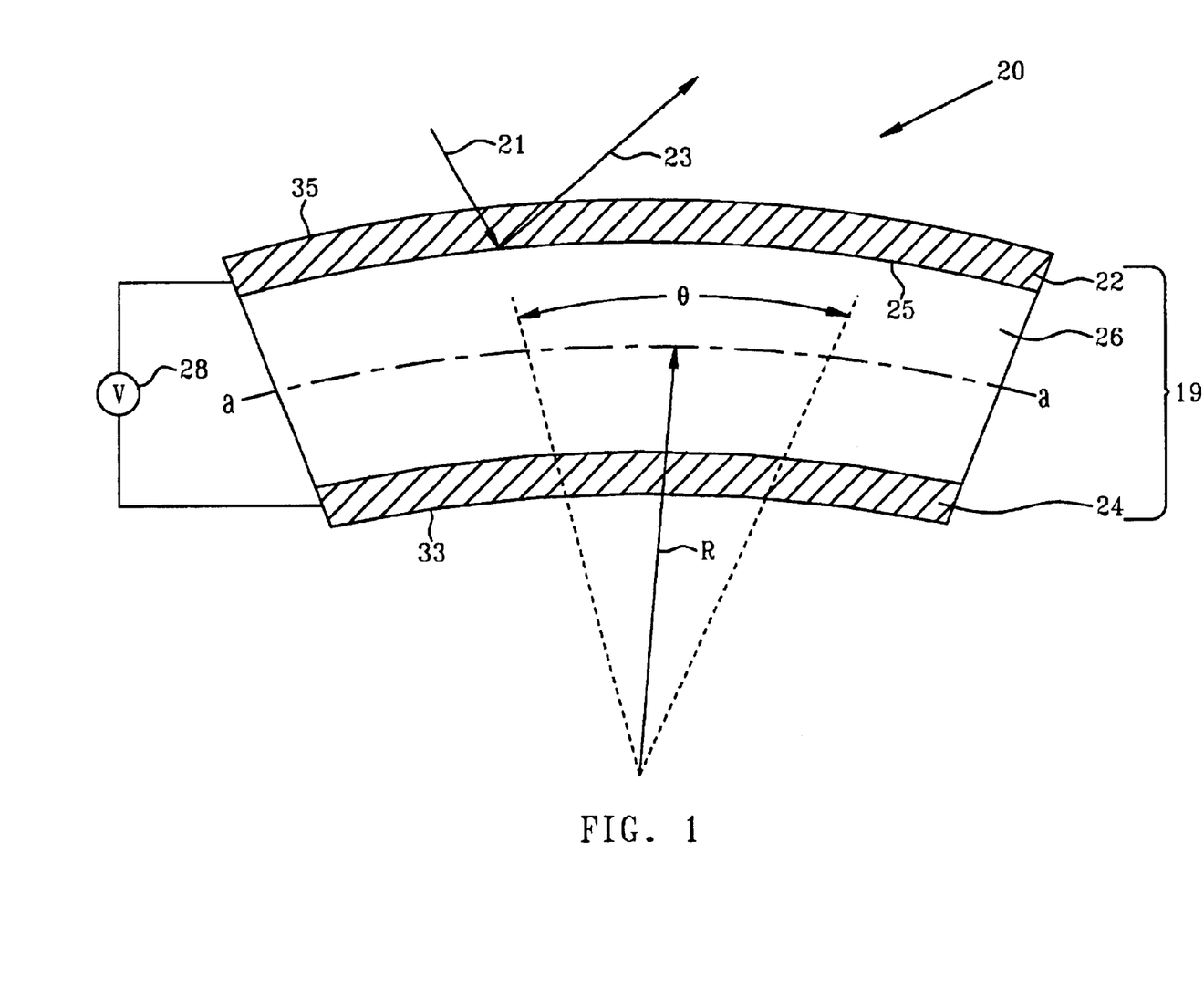
FIG. 1 shows an embodiment of a spatially conformable tunable filter having an operably reflective first electrode.

Referring to FIG. 1 there is shown an embodiment of a spatially conformable tunable filter 20 that may be used to absorb selected wavelengths of incident electromagnetic radiation, such as a visible light, while allowing other wavelengths to either be reflected or transmitted through the filter. Filter 20 comprises a structure 19 that includes a first flexible and optically reactive electrode 22; a second flexible optically reactive electrode 24; a flexible electro-optic material layer 26, such as a polymer dispersed liquid crystal, affixed between the first and second electrodes 22, 24; and a voltage source 28 connected to the first and second electrodes 22, 24 for establishing an electric field in the flexible electro-optic material layer 26. Characteristics of a flexible electro-optic material layer 26 suitable for use in conjunction with the embodiment described and depicted with reference to FIG. 1 include flexibility or pliability, i.e., the ability to conform to planar and non-planar surfaces, and an index of refraction that may be modulated when subjected to a changing voltage field. An example of a polymer dispersed liquid crystal suitable for use in the above-referenced embodiment is Privacy Film™, which is manufactured by 3M Company. Thus, modulation of the voltage across the first and second electrodes 22, 24 causes the index of refraction of the flexible electro-optic material layer 26 to change.

Figure 10:
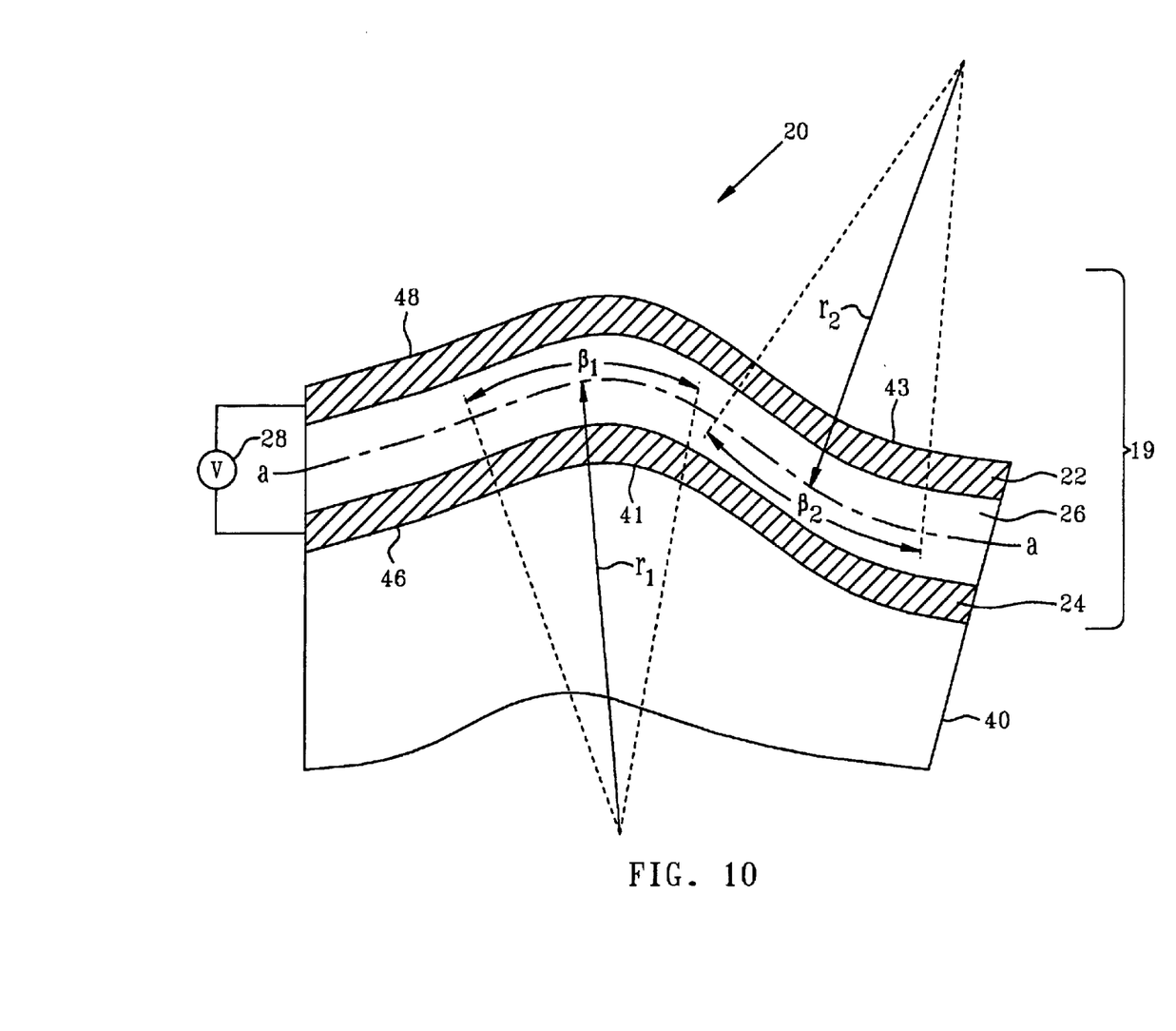
FIG. 10 shows the spatially conformable tunable filter of FIG. 2 affixed to a non-planar substrate.

By way of example, tunable filter 20 may be flexed so that an arcuate shaped section of a neutral axis a—a of filter 20 may have an arc length that is defined by an angle θ and a radius R, where $0 < R \leq \infty$ when the structure 19 is flexed. A neutral axis is a line of zero stress in a beam or structure that is bent. On one side of the neutral axis, the material comprising the structure is in tension and on the other side of the neutral axis, the material is in compression. However, it is to be understood that the entire structure 19 need not be flexed. For example, structure 19 may have one or more planar sections (R=∞), arcuate shaped sections, and combinations of both types of sections, depending on the requirements of a particular application. In FIG. 1, tunable filter 20 is shown flexed whereby the outside surface of second electrode 24 has a concave curvature. Thus, the material comprising filter 20 between the neutral axis a—a and the outside surface 33 of the second electrode 24 is in compression, and the material comprising filter 20 between the neutral axis a—a and the outside surface 35 of the first electrode 22 is in tension. However, it is to be understood that tunable filter 20 may be flexed to have one or more distinct concave sections on opposite sides of the neutral axis a—a. For example, as shown in FIG. 10, neutral axis a—a that exists when tunable filter 20 is flexed has a first concave section 41 defined by angle $\beta_1$ and radius $r_1$, and a second concave section 43 defined by angle $\beta_2$ and radius $r_2$, where $0 < r_1 \leq \infty$ and $0 < r_2 \leq \infty$, and concave sections 41 and 43 are on opposite sides 46 and 48, respectively, of tunable filter 20. Thus, the embodiment of tunable filter 20 shown in FIG. 10 includes a structure 19 having multiple arcuate shaped sections each having an arcuate shaped neutral axis. Although only two arcuate shaped sections of tunable filter 20 are shown in FIG. 10, it is to be understood that filter 20 may be configured to have any number of arcuate shaped sections, where the number of arcuate sections depends on the particular application.

The electrodes 22, 24 are optically reactive because they may be configured in conjunction with electro-optic material layer 26 to create either an optically transparent or reflective structure depending upon their thickness and material composition. For an optically reflective structure, electrode 22 would preferably use a layer of silver in the range of 10 nm to 500 nm. Electrode 24 may be any conductive layer such as silver, aluminum, gold, indium tin oxide, a conductive polymer, and the like having a thickness in the range of about 10 nm to 5000 nm. In the optically reflective embodiment, electrode 24 may be opaque, but must be sufficiently thin to be pliable or flexible. Electrodes 22 and 24 may be affixed to electro-optic layer 26 by means of evaporation, sputtering, thermo-compression bonding and the like. A plasmon interface 25 is formed at the interface of first electrode 22 and the flexible electro-optic material layer 26.

Figure 2:
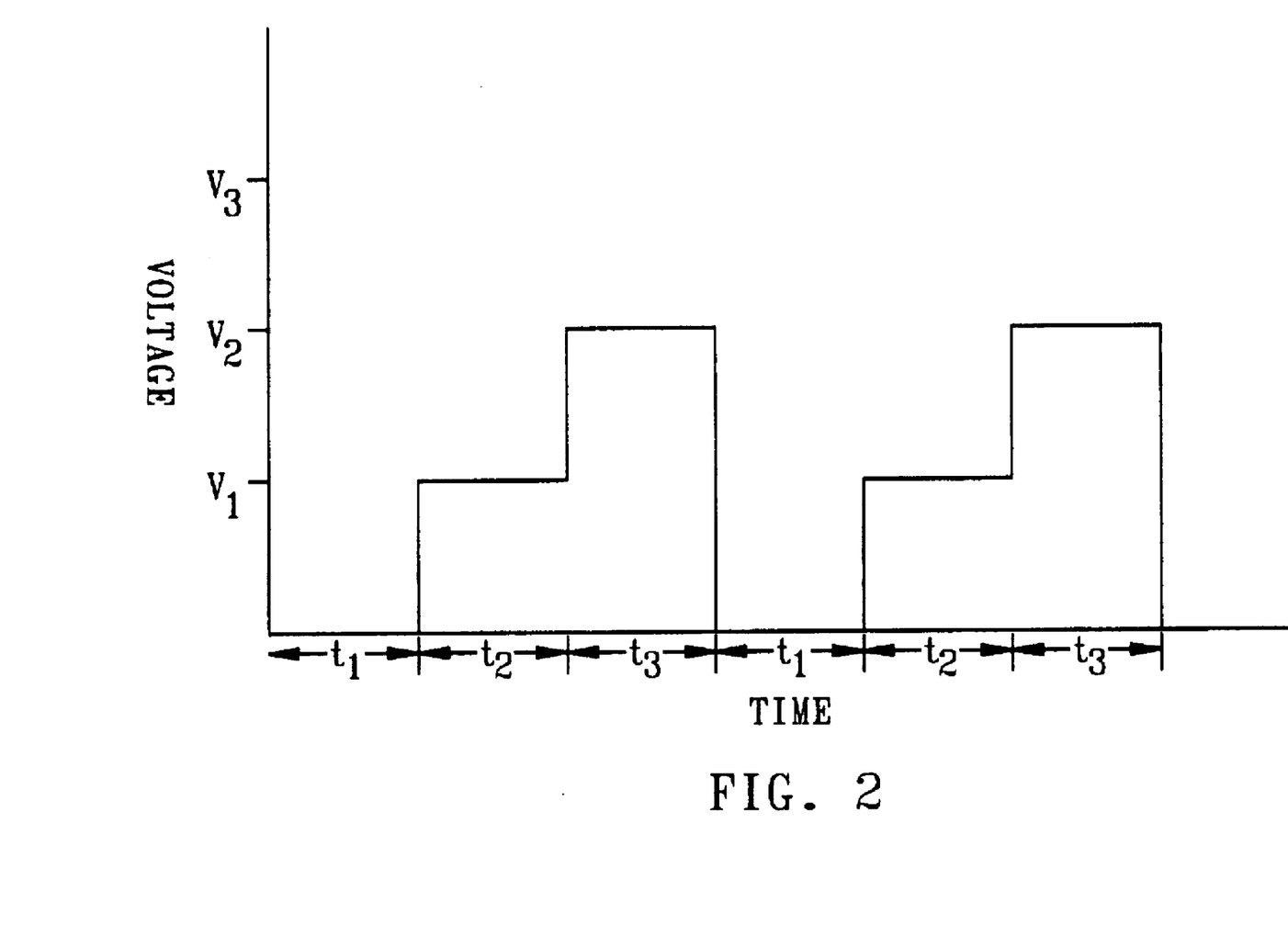
FIG. 2 shows an example of a voltage profile for producing three separate light signals each having a unique color band using the tunable filter of FIG. 1.

Voltage generator 28 may generate an AC or DC voltage as required for the job at hand. By way of example, a DC voltage $V_1$ is applied across electrodes 22 and 24 for a time of duration $t_1$ corresponding to a particular bandpass of the tunable filter 20. Then DC voltage $V_2$ is applied across electrodes 22 and 24 for a time $t_2$. Subsequently, DC voltage $V_3$ is applied across electrodes 22 and 24 for a time $t_3$, where $V_1 < V_2 < V_3$, and the sequence is repeated as shown in FIG. 2 to produce three color bands, or light signals each having unique spectral characteristics. Each applied voltage field is associated with an optical signal having a specific spectral composition. For example, application of voltages $V_1$, $V_2$ and $V_3$ across electrodes 22 and 24 causes the generation of optical signal $S_1$, $S_2$, and $S_3$, having spectral characteristics cardinally related to the corresponding voltages. Although the application of three different voltage values across the electrodes 22 and 24 has been described, it is to be understood that the tunable filter 20 may be used to generate any number of different colored optical signals, depending upon the requirements of a particular application.

Electrodes 22, 24 and electro-optic material layer 26 collectively provide a layered structure that may conform, i.e., be spatially conformable, to both planar and non-planar surfaces. By way of example, voltage source 28 may provide either an alternating current (AC) or direct current (DC) voltage output, depending on the requirements of a particular application. By changing the refractive index of the electro-optic layer 26, the electromagnetic absorption characteristics of the plasmon interface 25 may be dynamically tuned.

In the embodiment of the filter 20 shown in FIG. 1, the second electrode 24 may be opaque or transparent, depending on the requirements of a particular application. By way of example, when embodied as an optically transparent structure, second electrode 24 may have a thickness in the range of about 10 nm to 500 nm and include material selected from the group that includes such as tin oxide, indium tin oxide, or any other electrically conductive oxide that may be formed into a transparent layer and affixed to the electro-optic layer 26. Alternatively, when embodied as an optically opaque structure, second electrode 24 may, for example, have a thickness in the range of about 10 nm to 5000 nm and include material selected from the group that includes aluminum, copper, silver, gold, titanium and electrically conductive polymers.

Figure 3:
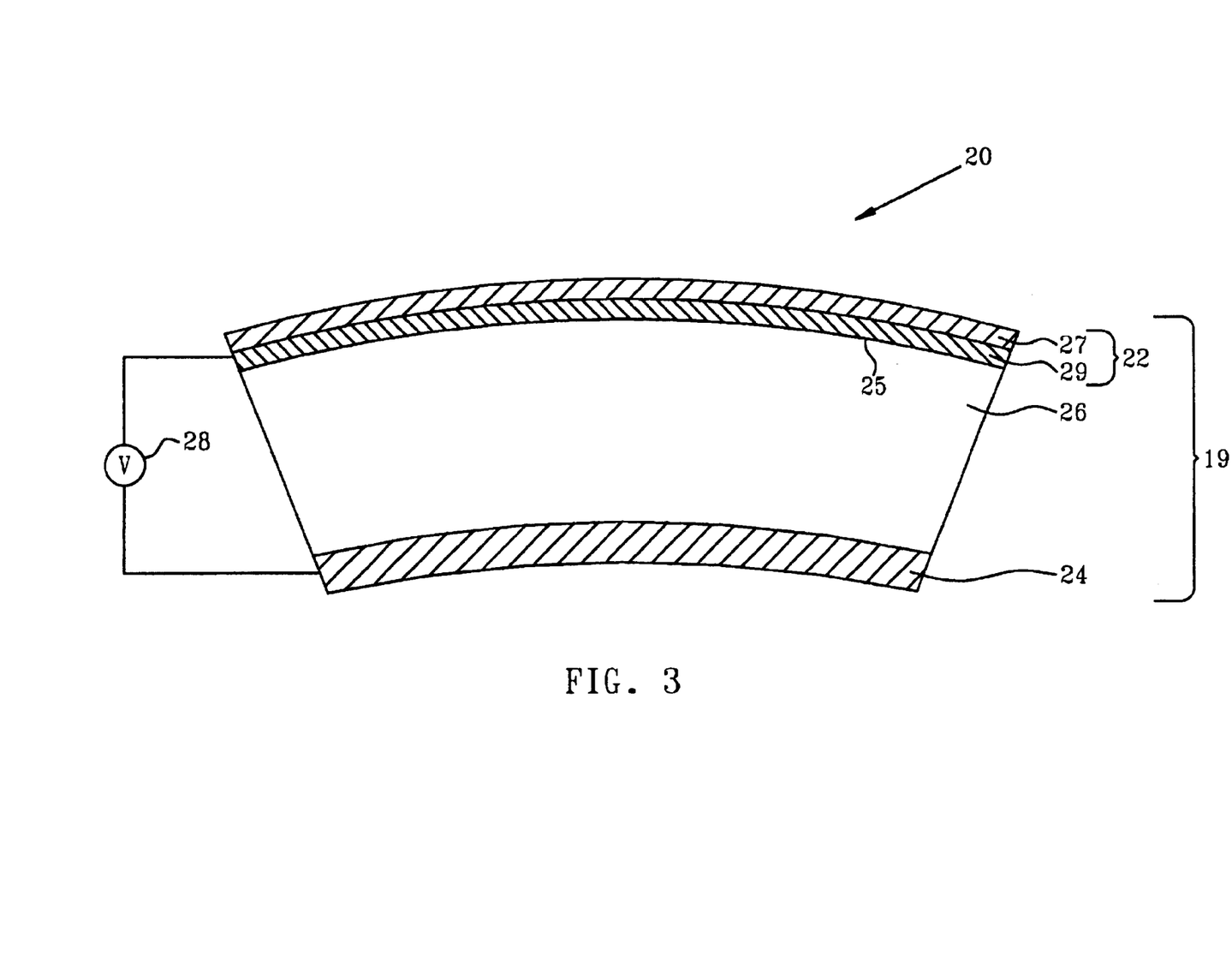
FIG. 3 shows the first electrode of FIG. 1 as a clad structure.

First electrode 22 may be a metal layer consisting essentially of silver and having a thickness of about 10 nanometers (nm) that is affixed to polymer dispersed liquid crystal 26 by any of several techniques which include physical vapor deposition and bonding. Alternatively, first electrode 22 may consist of a clad structure having two or more alternating layers of different metals. For example, when implemented as a clad structure, first electrode 22 may include a layer of aluminum 27 affixed to a layer of rhodium 29 as shown in FIG. 3.

Figure 4:
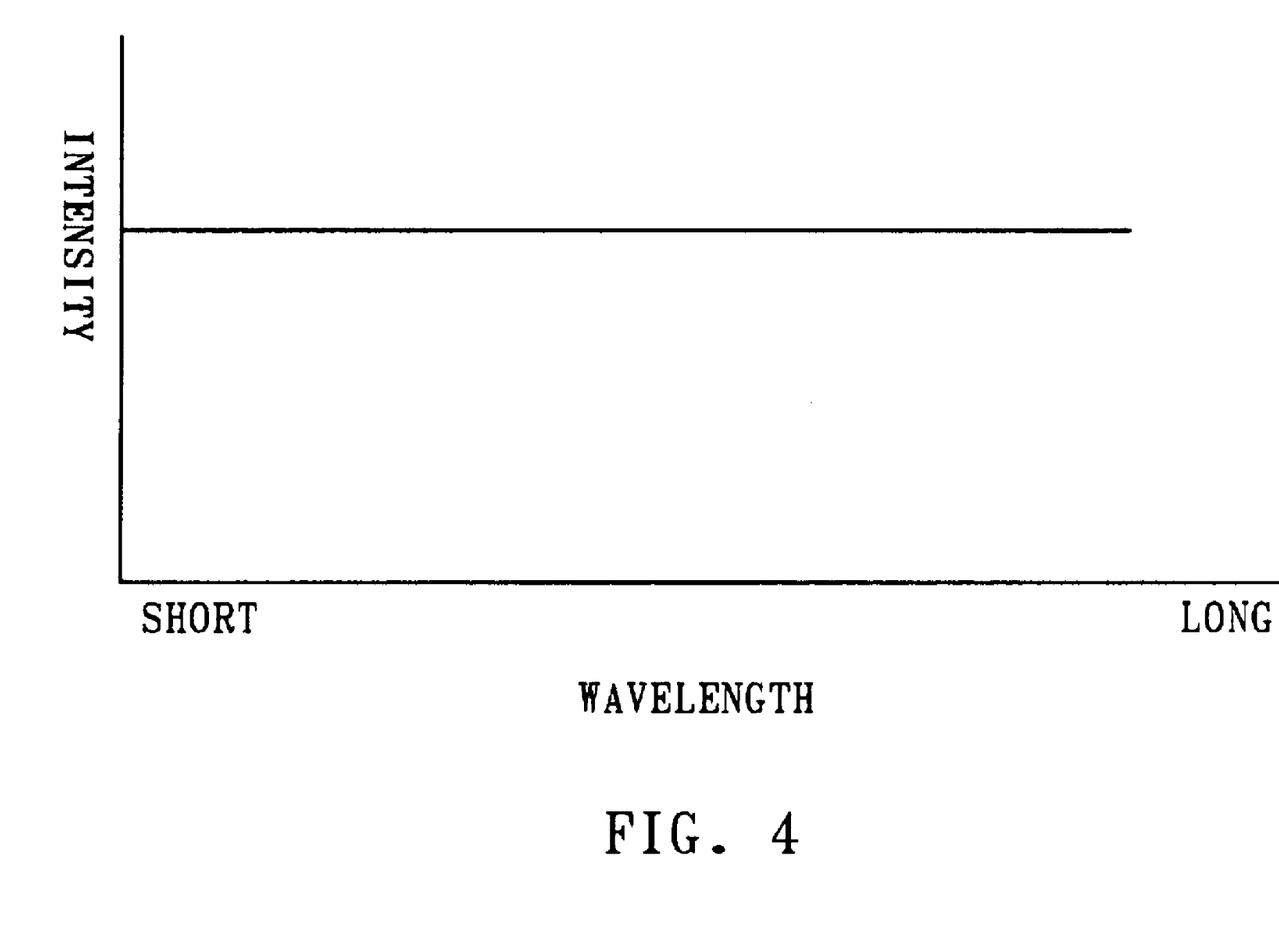
FIG. 4 represents a broadband, p-polarized optical signal.
Figure 5:
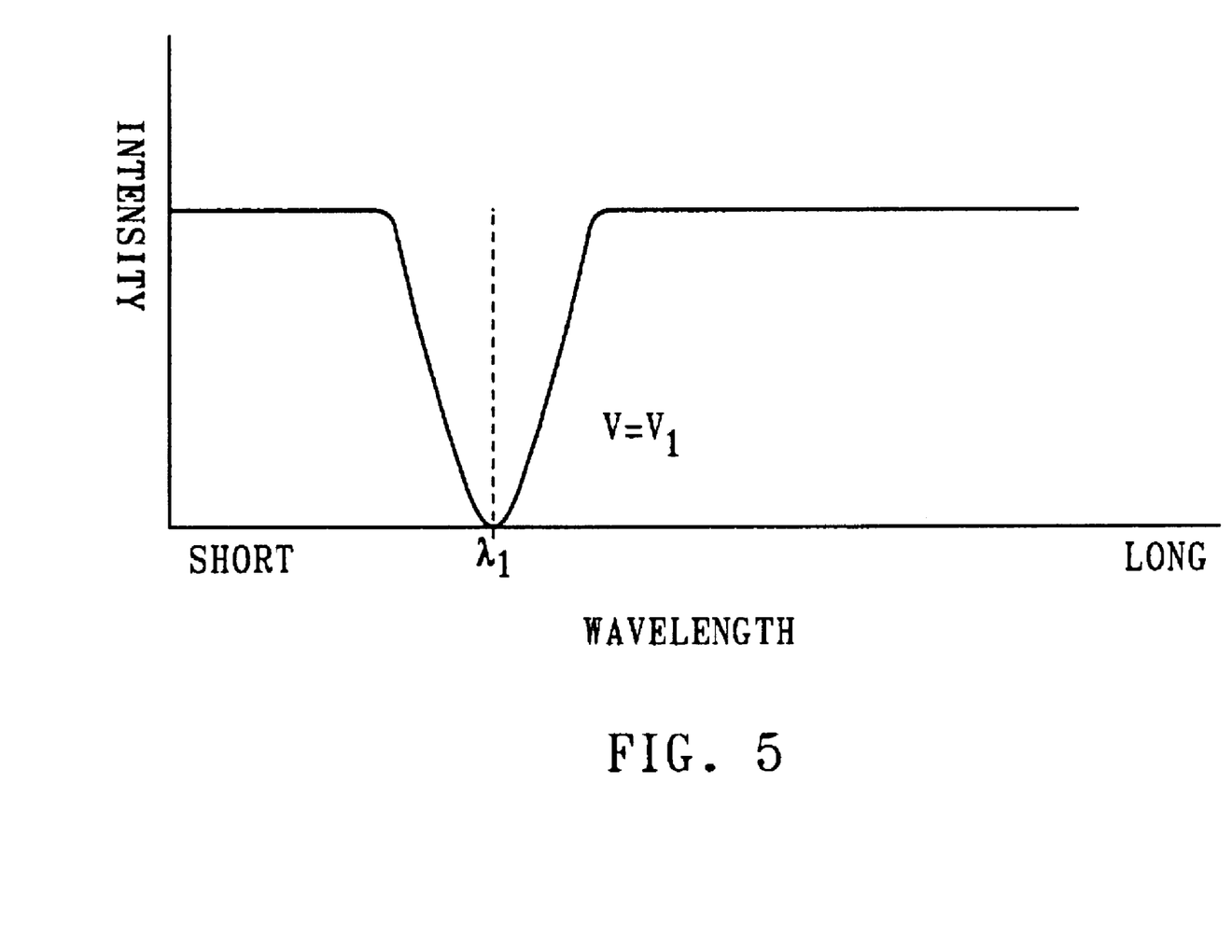
FIG. 5 shows the filter of FIG. 1 operated as a notch filter that absorbs spectral components having a center wavelength of $\lambda_1$.
Figure 6:
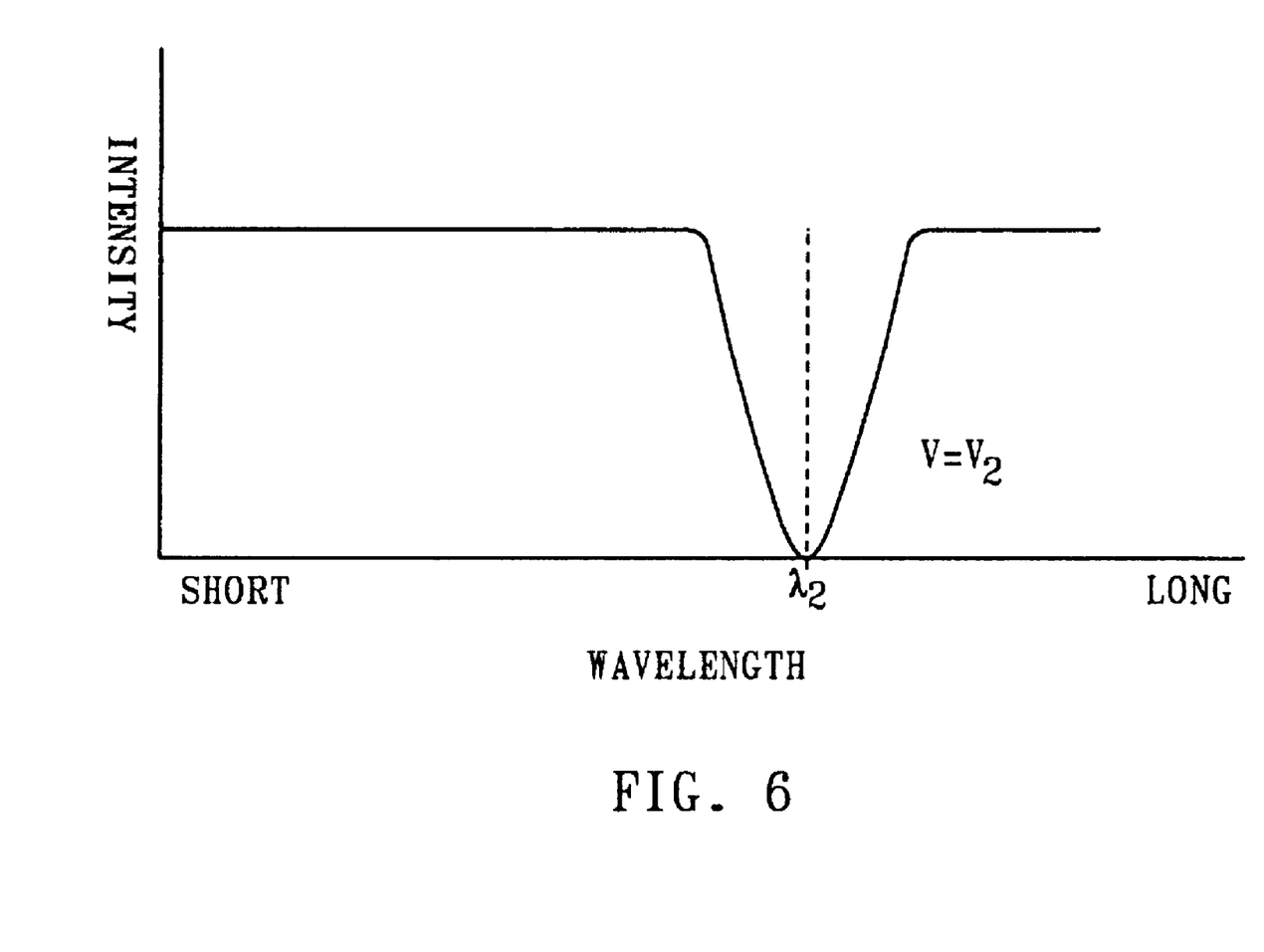
FIG. 6 shows the filter of FIG. 1 operated as a notch filter that absorbs spectral components having a center wavelength of $\lambda_2$.

Referring to FIG. 1, incident p-polarized broadband (multi-spectral) light signal 21 propagates through first electrode 22. If light signal 21 is a multi-spectral light signal, some of the spectral components of light signal 21 will be absorbed by plasmon interface 25, whereupon the complement of light signal 21, i.e., light signal 23, is reflected off plasmon interface 25 through first electrode 22. By changing the voltage across first and second electrodes 22, 24, the resonant absorption of plasmon interface 25 may be varied. Thus, the particular wavelengths of light signal 21 that are absorbed by plasmon interface 25 may be controlled, wherein spatially conformable tunable filter 20 may be tuned to reflect light signals which do not have particular spectral components. Thus, tunable filter 20 may be used to dynamically control light signal 23 to have a particular color or spectral components. For example, FIG. 4 is a graph that represents signal 21 as a broadband light signal comprised of multi-spectral signals having different wavelengths, for simplicity and by way of example, shown with equal intensity. FIG. 5 shows that if voltage source 28 provides a voltage level $V_1$ across first and second electrodes 22 and 24, spectral components of light signal 21 having a center wavelength of $\lambda_1$ are absorbed by plasmon interface 25. FIG. 6 shows that if voltage source 28 provides a voltage level $V_2$ across first and second electrodes 22 and 24, spectral components of light signal 21 having a center wavelength of $\lambda_2$ are absorbed by plasmon interface 25. Thus, filter 20 may be operated as a notch filter as exemplified in FIGS. 4 and 5.

Figure 7:
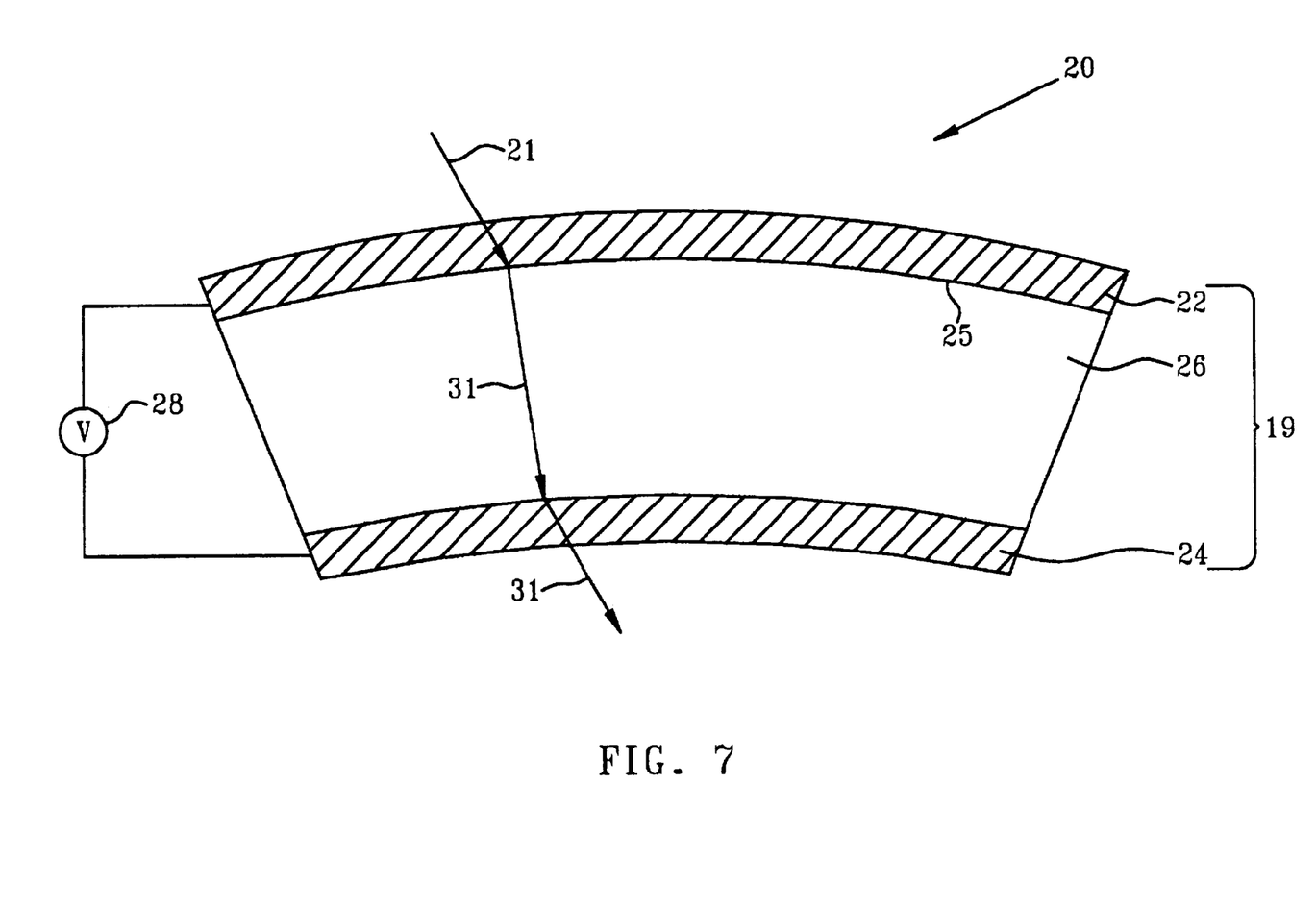
FIG. 7 shows an embodiment of a spatially conformable tunable filter having an operably transparent first electrode.

Referring to FIG. 7, incident p-polarized light signal 21 propagates through first electrode 22, where, if light signal 21 is a multi-spectral light signal, some of the spectral components of light signal 21 will be absorbed by plasmon interface 25, whereupon the complement of light signal 21, i.e., light signal 31, propagates through plasmon interface 25 and second electrode 24. In the embodiment of filter 20 shown in FIG. 7, electrodes 22 and 24 are transparent. By changing the voltage across first and second electrodes 22, 24, the index of refraction of electro-optic material layer 26 and hence, the resonant absorption of plasmon interface 25, may be dynamically tuned so that selected spectral components characterized by their associated wavelengths are absorbed by the plasmon interface 25. Thus, light signal 31 is the complement of light signal 21, and may be dynamically tuned or controlled to have a particular color or spectral components.

Figure 8:
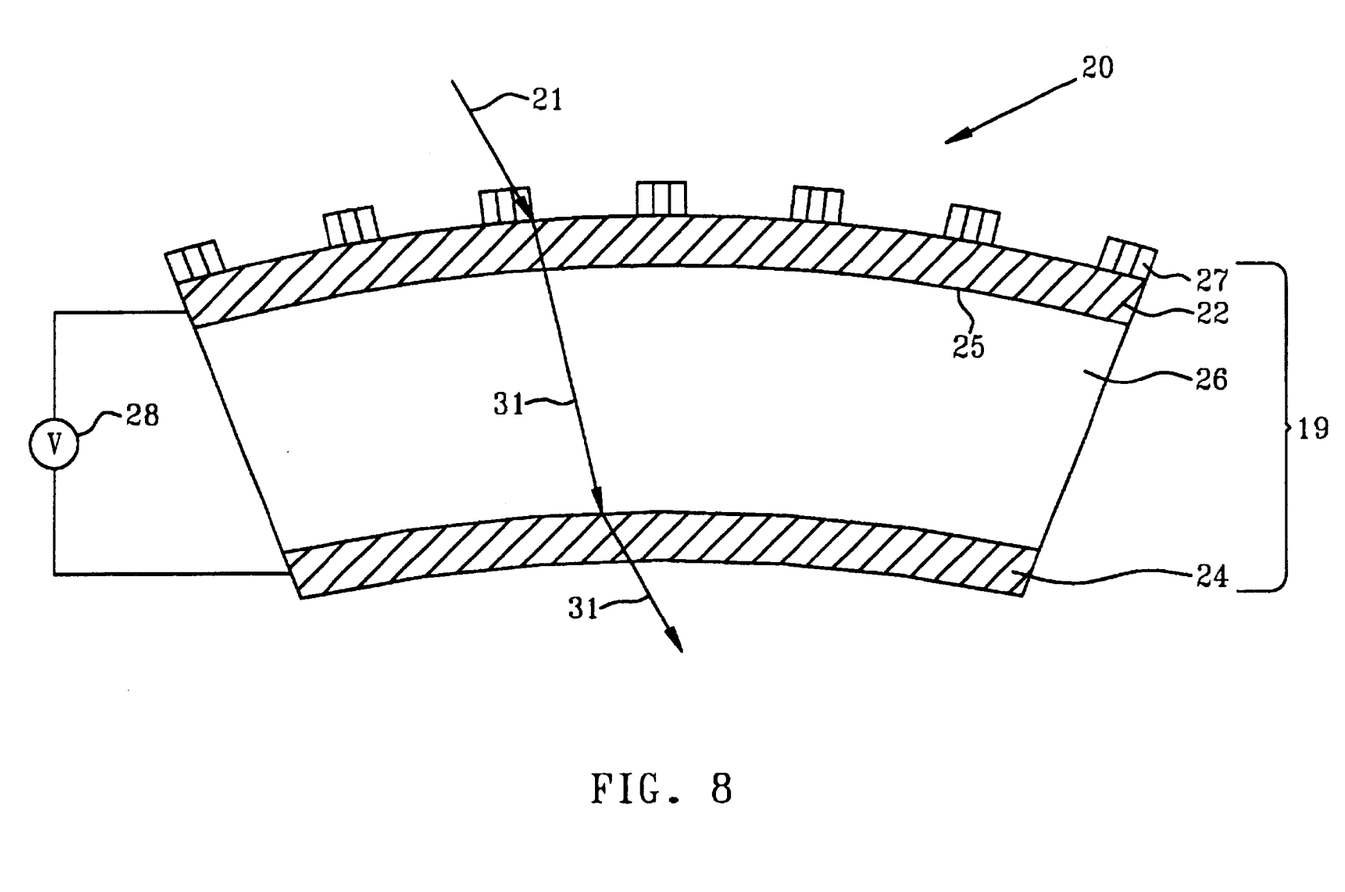
FIG. 8 shows an embodiment of a spatially conformable tunable filter having a first electrode configured as an optically diffractive element.

FIG. 8 shows an embodiment of a spatially conformable tunable filter 20 wherein first electrode 22 is operably coupled to an optically diffractive element 27, such as a diffraction grating or diffractive lens, that may be affixed to, or formed on first electrode 22. When implemented as an optically diffractive element, element 27 efficiently optically couples light energy such as light signal 21 into filter 20. The optically diffractive element may be made of a patterned silicon dioxide layer formed on electrode 22, as for example, using standard spin-on glass or plasma-enhanced chemical vapor deposition techniques.

Figure 9:
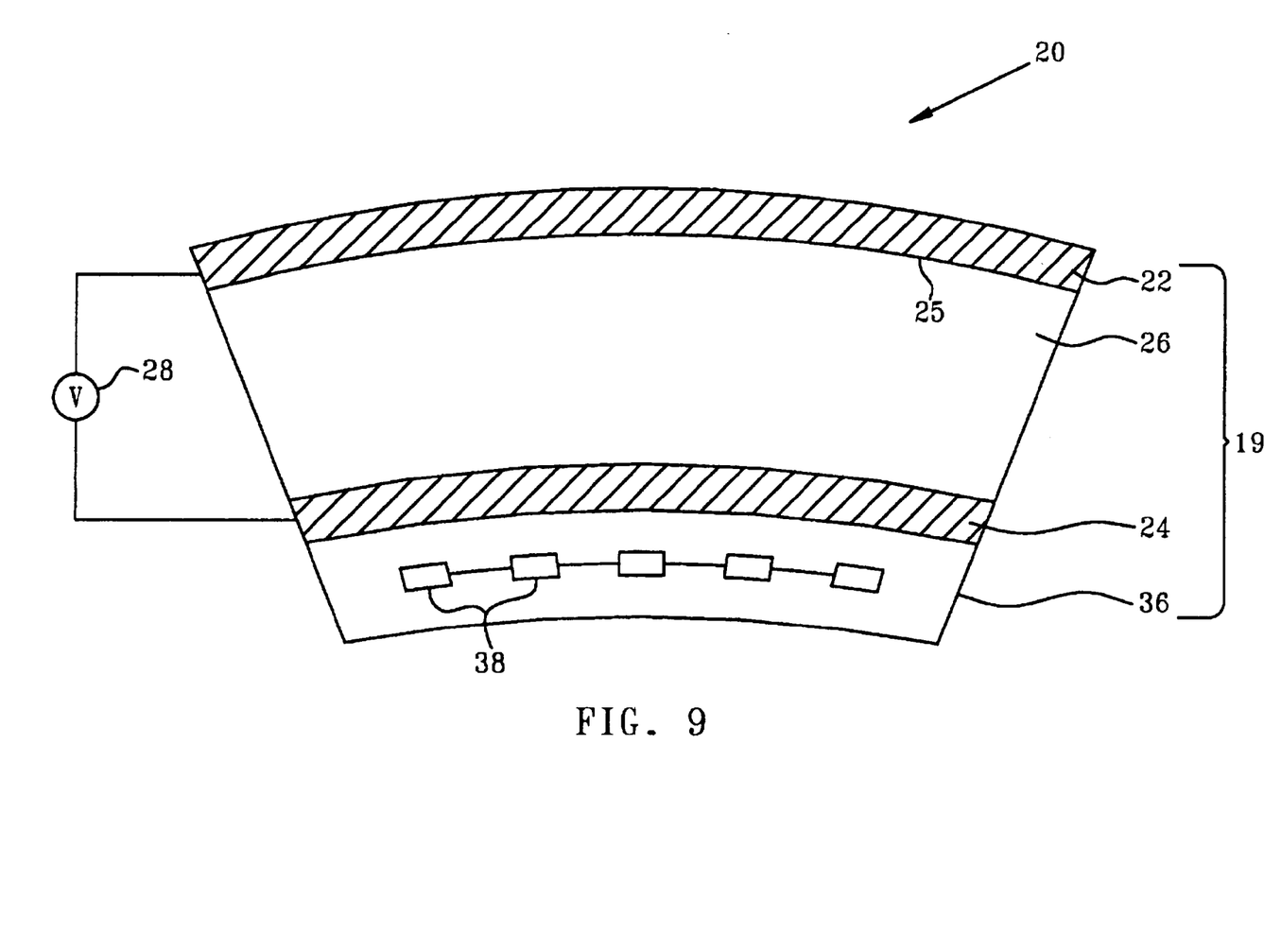
FIG. 9 shows the spatially conformable tunable filter of FIG. 1 affixed to a photo-responsive semiconductor circuit.

FIG. 9 shows light filter 20 affixed to semiconducting structure 36 which may include interconnected photo-responsive semiconducting elements 38 that change state in response to detecting light signal 31. Semiconducting elements 38 may be selected so that they only change state upon detection of a light signal 31 having particular spectral components. Thus, filter 20 may be operated as an optical switch for controlling the operation of photo-responsive semiconducting elements 38. Examples of photo-conductive elements 38 that may be integrated into semiconducting structure 36 include charge coupled devices (CCDs), phototransistors, photo diodes, active pixel sensors, and the like.

FIG. 10 shows filter 20 affixed to a non-planar substrate 40 which may be opaque, transparent, or translucent. Applications of filter 20 include use as dynamically tuned window tinting, and privacy screens.

Obviously, many modifications and variations of the invention are possible in light of the above teachings. It is therefore to be understood that within the scope of the appended claims, the invention may be practiced otherwise than as specifically described.

I claim:

1. A spatially conformable tunable filter, comprising:
   a structure that includes:
      a first flexible and optically reactive electrode;
      a second flexible and optically reactive electrode;
      a flexible electro-optic material layer affixed between said first and second electrodes and having a voltage dependent refractive index; and
      a voltage source connected to said first and second electrodes for establishing an electric field in said electro-optic material layer and dynamically controlling said index of refraction;
   wherein a section of said structure has an arcuate shaped neutral axis having a radius R when said structure is flexed, where $0 < R \leq \infty$.

2. The spatially conformable tunable filter of claim 1 wherein said electro-optic material includes a polymer dispersed liquid crystal.

3. The spatially conformable tunable filter of claim 1 wherein said first electrode and said polymer dispersed liquid crystal form an optically reflective interface.

4. The spatially conformable tunable filter of claim 2 wherein said first electrode and said polymer dispersed liquid crystal form an optically transparent interface.

5. The spatially conformable tunable filter of claim 1 wherein said first electrode is a metal layer that includes silver.

6. The spatially conformable tunable filter of claim 1 wherein said first electrode includes an aluminum layer affixed to a rhodium layer.

7. The spatially conformable tunable filter of claim 1 wherein said second electrode consists essentially of a transparent oxide.

8. The spatially conformable tunable filter of claim 7 wherein said transparent oxide is a material selected from the group that includes tin oxide and indium tin oxide.

9. The spatially conformable tunable filter of claim 1 where in said second electrode includes an optically opaque material.

10. The spatially conformable tunable filter of claim 9 wherein said optically opaque material is selected from the group that includes aluminum, copper, silver, titanium and gold.

11. The spatially conformable tunable filter of claim 10 wherein said optically opaque material includes an electrically conductive polymer.

12. The spatially conformable tunable filter of claim 1 which further includes a semiconducting circuit that is responsive to optical energy that propagates trough said second electrode.

13. The spatially conformable tunable filter of claim 1 wherein said voltage source generates an alternating voltage.

14. The spatially conformable tunable filter of claim 1 wherein said voltage source generates a direct current voltage.

15. A spatially conformable tunable filter, comprising:
   a structure that includes:
      a first flexible electrode;
      a second flexible electrode;
      a flexible electro-optic material layer affixed between said first and second electrodes and having a voltage dependent refractive index;
      an optically diffractive element affixed to said first flexible electrode and
      a voltage source electrically coupled to said first and second electrodes for establishing a voltage field in said electro-optic material layer and controlling said index of refraction;
   wherein a section of said structure has an arcuate shaped neutral axis having a radius R when said structure is flexed, where $0 < R \leq \infty$.

16. The spatially conformable tunable filter of claim 15 wherein said optically diffractive element is a diffraction grating.

17. The spatially conformable tumble filter of claim 16 wherein said optically diffractive element is a diffractive lens.

18. The spatially conformable tunable filter of claim 16 wherein said electro-optic material layer includes a polymer dispersed liquid crystal.

19. A method for filtering optical energy, comprising the steps of:
   receiving a light signal at a plasmon interface between a flexible first electrode and a flexible electro-optic material;
   applying a voltage potential across said first electrode and a flexible second electrode in contact with said electro-optic material; and
   modulating said voltage potential to change the optical absorption characteristics of said plasmon interface, where said first and second electrodes and said electro-optic material define a structure with an arcuate sped neutral axis having a radius R when said structure is flexed, where $0 < R \leq \infty$.

20. The method of claim 19 wherein said electro-optic material includes a polymer dispersed liquid crystal.

21. A spatially conformable tunable filter, comprising:
   a structure that includes:
      a substrate having a non-planar surface;
      a first flexible and optically reactive electrode that is transparent;
      a second flexible and optically reactive electrode that is transparent, and which is affixed to said non-planar surface;
      a flexible electro-optic material layer affixed between said first and second electrodes and having a voltage dependent refractive index; and
      a voltage source connected to said first and second electrodes for establishing an electric field in said electro-optic material layer and dynamically control said index of refraction;
   wherein a section of said structure has an arcuate shaped neutral axis having a radius R when said structure is flexed, where $0 < R \leq \infty$.

22. The spatially conformable tunable filter of claim 21 wherein said electro-optic material includes a polymer dispersed liquid crystal.

23. The spatially conformable tunable filter of claim 21 wherein said substrate is transparent.

24. The spatially conformable tunable filter of claim 21 wherein said substrate is translucent.

25. A spatially conformable tunable filter, comprising:
   a structure that includes:
      a first flexible and optically reactive electrode;
      a second flexible and optically reactive electrode;
      a flexible electro-optic material layer affixed between said first and second electrodes and having a voltage dependent refractive index; and
      a voltage source connected to said first and second electrodes for establishing an electric field in said electro-optic material layer and dynamically controlling said index of refraction;
   wherein said structure has multiple arcuate shaped sections each having an arcuate shaped neutral axis.

* * * * *